United States Patent
Datar et al.

(10) Patent No.: US 9,712,588 B1
(45) Date of Patent: *Jul. 18, 2017

(54) GENERATING A STREAM OF CONTENT FOR A CHANNEL

(71) Applicant: Google Inc., Mountain View, CA (US)

(72) Inventors: Mayur Datar, Pune (IN); Jonathan Terleski, Mountain View, CA (US); Justin Lewis Kosslyn, San Francisco, CA (US); Andrew Tomkins, San Jose, CA (US); Ray Su, Sunnyvale, CA (US); Christopher Wiggins, New York, NY (US)

(73) Assignee: Google Inc., Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/629,034

(22) Filed: Feb. 23, 2015

Related U.S. Application Data

(63) Continuation of application No. 13/225,209, filed on Sep. 2, 2011, now Pat. No. 8,996,629.

(60) Provisional application No. 61/424,636, filed on Dec. 18, 2010.

(51) Int. Cl.
*H04L 29/06* (2006.01)
*G06F 17/30* (2006.01)

(52) U.S. Cl.
CPC ...... *H04L 65/602* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,003,515 | B1 | 2/2006 | Glaser et al. |
| 7,106,848 | B1 | 9/2006 | Barlow et al. |

(Continued)

FOREIGN PATENT DOCUMENTS

| WO | WO02079984 | 10/2002 |
|---|---|---|

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Hassan Phillips
*Assistant Examiner* — Omeed D Rahgozar
(74) *Attorney, Agent, or Firm* — Patent Law Works LLP

(57) ABSTRACT

A system and method for generating a stream of content for a channel. The channel application includes a content categorizer, a scoring engine and a channel engine. The content categorizer categorizes new content items received from heterogeneous data sources. The channel engine identifies a channel category for a user based at least in part on at least one of a historical trend and a user activity. The scoring engine queries the new content items based on the channel category and at least one other channel attribute. The scoring engine retrieves candidate content items that include the channel category and the other channel attribute. The scoring engine then generates a stream of content from the candidate content items for the channel.

24 Claims, 9 Drawing Sheets

(56) References Cited

U.S. PATENT DOCUMENTS

| | | | |
|---|---|---|---|
| 7,366,990 B2 | 4/2008 | Pitroda |
| 7,401,025 B1 | 7/2008 | Lokitz |
| 7,555,110 B2 | 6/2009 | Dolan et al. |
| 7,610,287 B1 | 10/2009 | Dean et al. |
| 7,742,468 B2 | 6/2010 | Vagelos |
| 7,761,454 B2 | 7/2010 | Smyth et al. |
| 7,827,110 B1 | 11/2010 | Wieder |
| 7,962,482 B2 | 6/2011 | Handman et al. |
| 8,055,655 B1 | 11/2011 | He |
| 8,091,032 B2 | 1/2012 | Fischer |
| 8,255,812 B1 | 8/2012 | Parparita et al. |
| 2001/0042060 A1 | 11/2001 | Rouse et al. |
| 2002/0137490 A1 | 9/2002 | Gallant |
| 2002/0143874 A1 | 10/2002 | Marquette et al. |
| 2002/0167539 A1 | 11/2002 | Brown et al. |
| 2002/0194076 A1 | 12/2002 | Williams, Jr. et al. |
| 2003/0061211 A1 | 3/2003 | Shultz et al. |
| 2004/0258220 A1 | 12/2004 | Levine et al. |
| 2004/0267740 A1 | 12/2004 | Liu et al. |
| 2005/0038688 A1 | 2/2005 | Collins et al. |
| 2005/0152521 A1 | 7/2005 | Liljestrand |
| 2006/0020616 A1 | 1/2006 | Hardy et al. |
| 2006/0026288 A1 | 2/2006 | Acharya et al. |
| 2006/0041530 A1 | 2/2006 | Milic-Frayling et al. |
| 2006/0074883 A1 | 4/2006 | Teevan et al. |
| 2006/0077957 A1 | 4/2006 | Reddy et al. |
| 2006/0136589 A1 | 6/2006 | Konig et al. |
| 2006/0167857 A1 | 7/2006 | Kraft et al. |
| 2006/0206604 A1 | 9/2006 | O'Neil et al. |
| 2006/0212444 A1 | 9/2006 | Handman et al. |
| 2006/0224509 A1 | 10/2006 | Walker et al. |
| 2006/0242139 A1* | 10/2006 | Butterfield et al. ............... 707/5 |
| 2006/0282336 A1 | 12/2006 | Huang |
| 2007/0016553 A1 | 1/2007 | Dumais et al. |
| 2007/0043742 A1 | 2/2007 | Arguello et al. |
| 2007/0060099 A1 | 3/2007 | Ramer et al. |
| 2007/0109616 A1 | 5/2007 | Thompson |
| 2007/0127631 A1 | 6/2007 | Difiglia |
| 2007/0143260 A1 | 6/2007 | Markov et al. |
| 2007/0162424 A1 | 7/2007 | Jeh et al. |
| 2007/0171898 A1 | 7/2007 | Salva |
| 2007/0173236 A1 | 7/2007 | Vishwanathan et al. |
| 2007/0219754 A1 | 9/2007 | D'Ambrosio |
| 2007/0242626 A1 | 10/2007 | Altberg et al. |
| 2007/0244884 A1 | 10/2007 | Yang |
| 2007/0248077 A1 | 10/2007 | Mahle, Jr. et al. |
| 2007/0265905 A1 | 11/2007 | Lazier |
| 2008/0004989 A1 | 1/2008 | Yi |
| 2008/0026804 A1 | 1/2008 | Baray et al. |
| 2008/0040474 A1* | 2/2008 | Zuckerberg et al. ......... 709/224 |
| 2008/0056475 A1 | 3/2008 | Brannick et al. |
| 2008/0059308 A1 | 3/2008 | Gerken |
| 2008/0059460 A1 | 3/2008 | Lunenfeld |
| 2008/0077462 A1 | 3/2008 | Patel et al. |
| 2008/0147450 A1 | 6/2008 | Mortimore |
| 2008/0192656 A1 | 8/2008 | Vagelos |
| 2008/0208841 A1 | 8/2008 | Zeng et al. |
| 2008/0209320 A1 | 8/2008 | Mawhinney et al. |
| 2008/0255977 A1 | 10/2008 | Altberg et al. |
| 2009/0006398 A1 | 1/2009 | Lam et al. |
| 2009/0113288 A1 | 4/2009 | Thampy et al. |
| 2009/0125403 A1 | 5/2009 | Li |
| 2009/0164408 A1 | 6/2009 | Grigorik et al. |
| 2009/0210321 A1 | 8/2009 | Rapp |
| 2009/0222481 A1 | 9/2009 | Fisher et al. |
| 2010/0030717 A1 | 2/2010 | Agarwal et al. |
| 2010/0042928 A1 | 2/2010 | Rinearson |
| 2010/0094878 A1 | 4/2010 | Soroca et al. |
| 2010/0131527 A1 | 5/2010 | Wohlert |
| 2010/0138423 A1 | 6/2010 | Moore et al. |
| 2010/0191799 A1 | 7/2010 | Fiedorowicz et al. |
| 2010/0287368 A1 | 11/2010 | Shuster et al. |
| 2010/0299360 A1 | 11/2010 | Yi |
| 2011/0041076 A1 | 2/2011 | Sinn et al. |
| 2011/0098156 A1 | 4/2011 | Ng et al. |
| 2011/0154183 A1 | 6/2011 | Burns et al. |
| 2011/0161323 A1 | 6/2011 | Hagiwara |
| 2011/0161336 A1 | 6/2011 | Shiga et al. |
| 2011/0167054 A1 | 7/2011 | Bailey et al. |
| 2011/0178995 A1 | 7/2011 | Suchter et al. |
| 2011/0196933 A1 | 8/2011 | Jackson et al. |
| 2011/0218946 A1 | 9/2011 | Stern et al. |
| 2011/0225170 A1 | 9/2011 | Obasanjo et al. |
| 2011/0246907 A1 | 10/2011 | Wang et al. |
| 2012/0054190 A1 | 3/2012 | Peters |
| 2012/0084291 A1 | 4/2012 | Chung et al. |
| 2012/0102410 A1 | 4/2012 | Gewecke et al. |
| 2012/0113121 A1 | 5/2012 | Luo |
| 2012/0144328 A1 | 6/2012 | O'byrne |
| 2012/0158753 A1* | 6/2012 | He et al. ...................... 707/752 |
| 2013/0204873 A1 | 8/2013 | Vandermolen et al. |
| 2013/0247212 A1 | 9/2013 | Muriello et al. |
| 2014/0019551 A1 | 1/2014 | Zuckerberg et al. |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230. 8.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

(56) References Cited

OTHER PUBLICATIONS

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg. 28.

Singh et al., "CINEMA: Columbia InterNet Extensible Multimedia Architecture," Department of Computer Science, Columbia University, May 2002 pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Yu et al., "It Takes Variety to Make a World: Diversification in Recommender Systems," 2009, pp. 1-11, downloaded from https://openproceedings.org/2009/conf/edbt/YuLA09.pdf.

Adamic et al., "Search in power-law networks," Physical Review E, 2001, vol. 64, HP Labs/Stanford University, The American Physical Society.

\* cited by examiner

GENERATING A STREAM OF CONTENT FOR A CHANNEL

CROSS-REFERENCE TO RELATED APPLICATIONS

This application claims priority under 35 USC §120 to U.S. application Ser. No. 13/225,209, entitled, "Generating a Stream of Content for a Channel," filed on Sep. 2, 2011, and claims priority under 35 USC §119(e) to U.S. Application No. 61/424,636, entitled "Scoring Stream Items with Models Based on User Interests" filed Dec. 18, 2010, the entireties of which are herein incorporated by reference.

BACKGROUND

The specification relates to a system and method for generating a stream of content for a channel. In particular, the specification relates to generating a stream of content for a channel based on user interests and historical trends.

Many consumers of digital media have two somewhat contradictory goals: keep apprised of information in the areas they already find interesting and discover new content that is also enjoyable. Keeping apprised of information can become burdensome in the digital age because there is so much information. Hence, there is a need to present the best and most relevant information, without overwhelming the consumer. Furthermore, consumers have varied interests depending on the time of a year or a day. As a result, there is also a need to cater to the time dependent changes in the consumer's interests while presenting information. Similarly, discovering new content is difficult when the consumer is overburdened with existing content.

Prior attempts to solve these problems allow consumers to create personalized sections in feed aggregation websites that are defined by keywords. Often, these personalized sections present any item that includes the keywords even though the item is not of interest to the consumer, per se. In another method, consumers are allowed to manually subscribe to Really Simple Syndication (RSS) feeds from multiple websites. This method often leads to the consumer viewing multiple items which contain redundant information.

SUMMARY OF THE INVENTION

In some examples, the specification describes a system and method for generating a stream of content for a channel using a channel application. The channel application includes a processing unit, a model generation engine, a scoring engine, a collaborative filtering engine, a content categorizer, a channel engine, and a user interface engine. The model generation engine generates a model that is used to determine suggestions for channels. The content categorizer categorizes new content items received from heterogeneous data sources. The channel engine identifies a channel category for a user based on at least one of a historical trend and a user activity. The historical trend is at least one of an increase in a number of new content items for a content category, an increase in a number of times one of the new content items is accessed and an event. A scoring engine queries the new content items based on the channel category and at least one other channel attribute. The scoring engine receives candidate content items that include the channel category and the at least one other channel attribute. The scoring engine then generates a stream of content from the candidate content items for the channel. The scoring engine transmits the stream of content to the channel engine, which generates a channel.

In one embodiment, the user interface engine generates a user interface for the user to define the channel category and the channel attribute. The scoring engine queries the new content items based on the user defined channel category and channel attribute and then generates the stream of content. In another embodiment, the channel engine enables the user to subscribe to an existing channel.

In one embodiment, the channel engine enables the user to share the channel with at least one of a friend of the user, a community, a group, and an internet user.

BRIEF DESCRIPTION OF THE DRAWINGS

The specification is illustrated by way of example, and not by way of limitation, in the figures of the accompanying drawings in which like reference numerals are used to refer to similar elements.

DETAILED DESCRIPTION

Figure 1A:
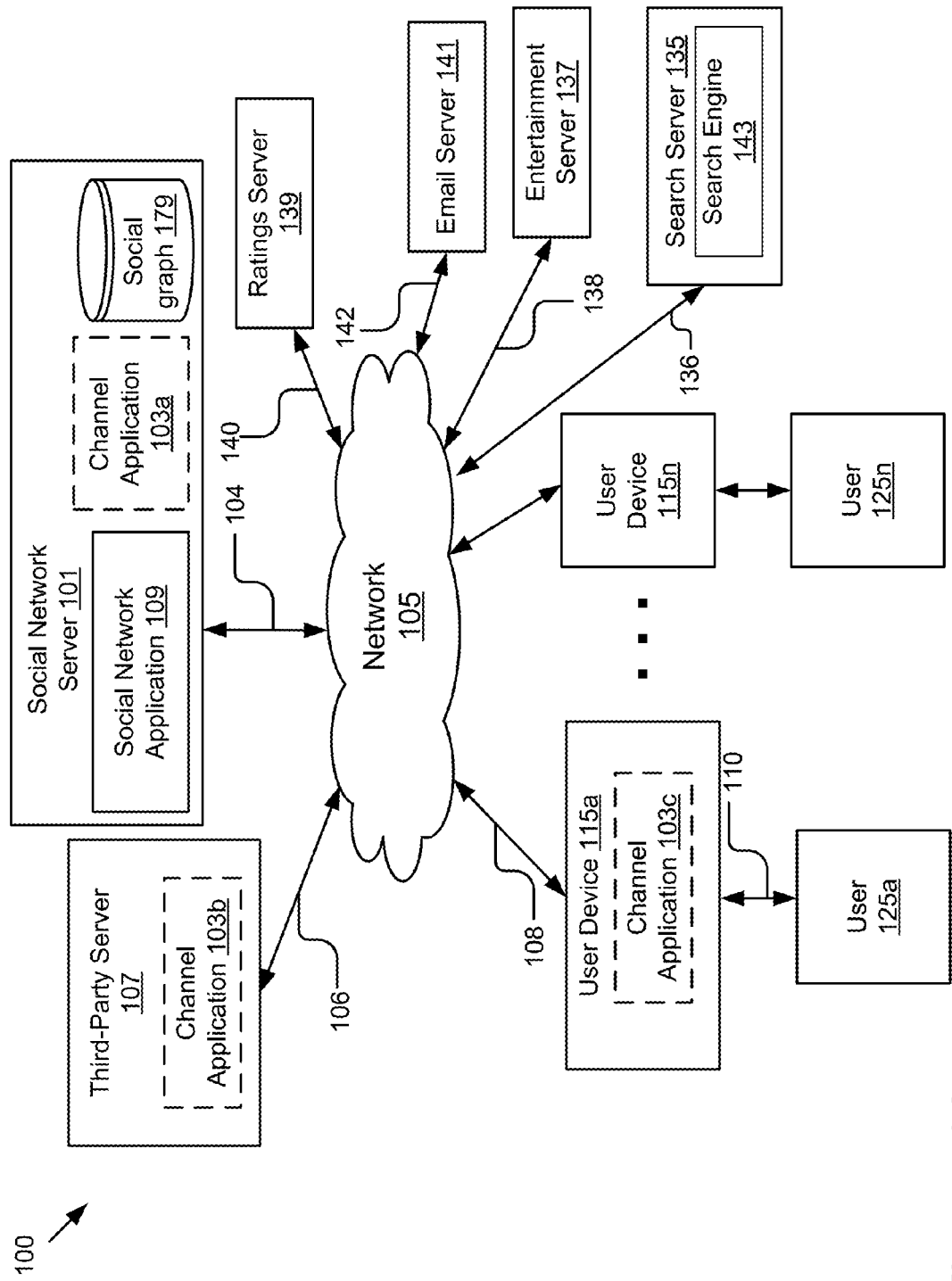
FIG. 1A is a high-level block diagram illustrating one embodiment of a system for generating a stream of content for a channel.

A system and method for generating a stream of content for a channel is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

An embodiment can take the form of an entirely hardware embodiment, an entirely software embodiment or an embodiment containing both hardware and software elements. A preferred embodiment is implemented in software, which includes but is not limited to firmware, resident software, microcode, etc.

Furthermore, an embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a block diagram of a system 100 for generating a stream of content for a channel according to one embodiment. The system 100 includes user devices 115$a$, 115$n$ that are accessed by users 125$a$, 125$n$, a social network server 101, a third party server 107, a ratings server 139, an email server 141, an entertainment server 137, and a search server 135. The ratings server 139 includes websites for rating places, people or objects (e.g. Google Hotpot). The entertainment server 137 includes websites with entertaining information, such as news articles. In FIG. 1A and the remaining figures, a letter after a reference number, such as "115$a$" is a reference to the element having that particular reference number. A reference number in the text without a following letter, such as "115," is a general reference to any or all instances of the element bearing that reference number. In the illustrated embodiment, these entities are communicatively coupled via a network 105.

In one embodiment, the channel application 103$a$ is operable on the social network server 101, which is coupled to the network via signal line 104. The social network server 101 also contains a social network application 109 and a social graph 179. Although only one social network server 101 is shown, persons of ordinary skill in the art will recognize that multiple social network servers 101 may be present. A social network is any type of social structure where the users are connected by a common feature, for example, Google+. The common feature includes friendship, family, work, an interest, etc. The common features are provided by one or more social networking systems, such as those included in the system 100, including explicitly-defined relationships and relationships implied by social connections with other online users, where the relationships form a social graph 179. In some examples, the social graph 179 reflects a mapping of these users and how they are related.

In another embodiment, the channel application 103$b$ is stored on a third-party server 107, which is connected to the network via signal line 106. The third-party server 107 includes software for generating a website (not shown). In one embodiment, the notifying application generates a user interface that is incorporated into the website. Although only one third-party server 107 is shown, persons of ordinary skill in the art will recognize that multiple third-party servers 107 may be present.

In yet another embodiment, the channel application 103c is stored on a user device 115a, which is connected to the network via signal line 108. The user device 115a is any computing device that includes a memory and a processor, such as a personal computer, a laptop, a smartphone, a cellular phone, a personal digital assistant (PDA), etc. The user 125a interacts with the user device 115a via signal line 110. Although only two user devices 115a, 115n are illustrated, persons of ordinary skill in the art will recognize that any number of user devices 115n are available to any number of users 125n.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 105 is coupled to the user devices 115a, 115n, the social network server 101, and the third party server 107, in practice any number of networks 105 can be connected to the entities.

The channel application 103 receives data for generating a stream of content for a channel from heterogeneous data sources. In one embodiment, the channel application 103 receives data from a third-party server 107, a social network server 101, user devices 115a, 115n, a search server 135 that is coupled to the network 105 via signal line 136, an entertainment server 137 that is coupled to the network 105 via signal line 138, a ratings server 139 that is coupled to the network 105 via signal line 140 and an email server 141 that is coupled to the network 105 via signal line 142. In one embodiment, the search server 135 includes a search engine 143 for retrieving results that match search terms from the Internet. In one embodiment, the search engine 143 is powered by Google®. In one embodiment, the channel application 103 generates a model based on the data from the heterogeneous data sources, identifies a channel category based on a user's activities and historical trends, receives candidate content items that include the channel category from heterogeneous data sources, scores the candidate content items by comparing them to the model, and generates a stream of content for the channel.

Channel Application 103

Figure 1B:
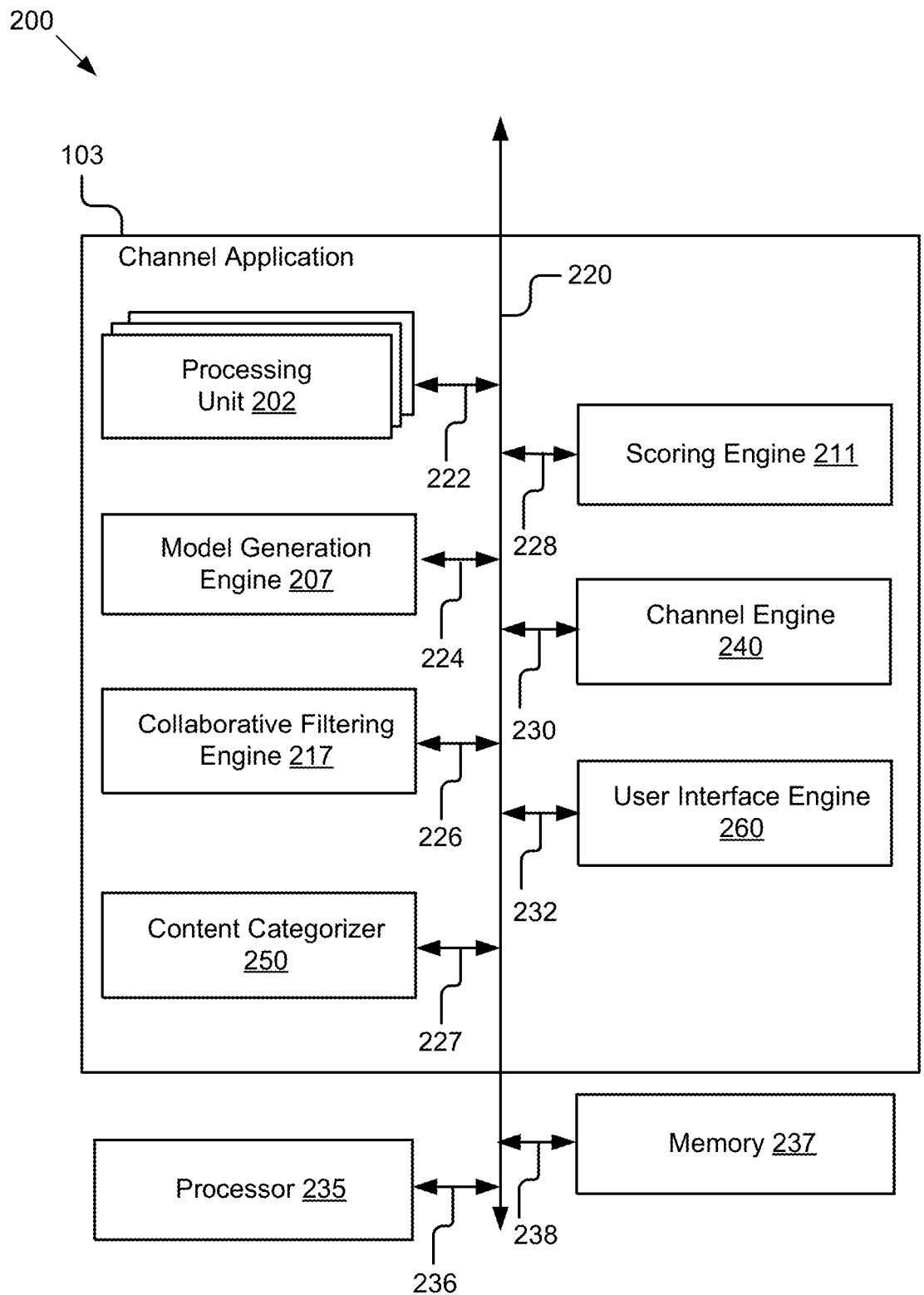
FIG. 1B is a block diagram illustrating one embodiment of a channel application.

Referring now to FIG. 1B, the channel application 103 is shown in detail. FIG. 1B is a block diagram of a computing device 200 that includes the channel application 103, a memory 237 and a processor 235. In one embodiment, the computing 200 device is a social network server 101. In another embodiment, the computing device 200 is a third party server 107. In yet another embodiment, the computing device 200 is a user device 115a.

The processor 235 comprises an arithmetic logic unit, a microprocessor, a general purpose controller, or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1B, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays, and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory, or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the channel application 103 comprises a processing unit 202, a model generation engine 207, a scoring engine 211, a collaborative filtering engine 217, a content categorizer 250, a channel engine 240, and a user interface engine 260 that are coupled to a bus 220.

The processing unit 202 is software including routines for receiving information about a user's interests, activities and social connections and for storing the information in the memory 237. In one embodiment, the processing unit 202 is a set of instructions executable by the processor 235 to provide the functionality described below for processing the information. In another embodiment, the processing unit 202 is stored in the memory 237 of the computing device 200 and is accessible and executable by the processor 235. In either embodiment, the processing unit 202 is adapted for cooperation and communication with the processor 235, the model generation engine 207, and other components of the computing device 200 via signal line 222.

The processing unit 202 obtains information about users from user input and/or prior actions of a user across a range of heterogeneous data sources including search (such as web, video, news, maps, alerts), entertainment (such as news, video, a personalized homepage, blogs, a reader, gadget subscriptions), social activity (such as interactions through email, profile information, text messaging such as short message service (SMS), microblogs, geographical locations, comments on photos, a social graph and other social networking information), and activity on third-party sites (such as websites that provide ratings, reviews and social networks where users indicate that they approve of content). This information is obtained, for example, from a user's search history, browsing history and other interactions with the Internet. The processing unit 202 stores the information with a designation of the source of the information.

In one embodiment, there are multiple processing units 202 that each receive data from a different heterogeneous data source. In another embodiment, the user information is received by the same processing unit 202. The processing unit 202 transmits the user information to memory 237 for storage. In one embodiment, the memory 237 partitions the user information from each heterogeneous data source in a separate data storage location. In another embodiment, the user information from heterogeneous data sources is stored in the same location in the memory 237. In yet another embodiment, the memory 237 partitions the model and the stream of content into separate storage locations as well.

The model generation engine 207 is software including routines for retrieving the user information from the memory 237 and generating a model based on the user information. In one embodiment, the model generation engine 207 is a set of instructions executable by the processor 235 to provide the functionality described below for generating the model. In another embodiment, the model generation engine 207 is stored in the memory 237 of the computing device 200 and is accessible and executable by the processor 235. In either embodiment, the model generation engine 207 is adapted for cooperation and communication with the processor 235, the processing unit 202, the scoring engine 211, the channel engine 240 and other components of the computing device 200 via signal line 224.

The model generation engine 207 receives user information from a variety of sources including, for example, queries, clicks, news clicks, gadgets, email interactions, etc., extracts features from the information and generates a model based on the extracted features. The model determines the relevance of items to users, along with floating point values to indicate the extent to which the relevance holds. Examples include liking a source, a primary location and a list of interests. The interests are generated from explicit information and inferred information. Explicit information is derived, for example, from a user's list of interests on a social network or indicating that they liked a particular content item. Inferred information takes into account a user's activities.

The model generation engine 207 will infer that a user is interested in a particular subject, for example, if the subject matter appears in search terms. For example, the model generation engine 207 infers that a user who searches for information about different types of butterflies is interested in butterflies. The model generation engine 207 can even infer information based on the user's friends' activities. For example, content items that interest the user's friends might also interest the user. As a result, in one embodiment, the model includes the user's friends' interests.

In one embodiment, the model generation engine 207 also generates a model that contains several pieces of global meta-information about the user's consumption patterns including how frequently the user consumes the stream of content of a channel and global statistics on how likely the user is to reshare various types of items. Lastly, the model includes a sequence of weights and multipliers that are used to make predictions about the user's likelihood of clicking on, sharing or otherwise engaging with stream items.

The model generation engine 207 generates the model from the user information across the heterogeneous data sources. In one embodiment, the model generation engine 207 builds extensions to the model that employ the patterns of behavior of other users. For example, the model predicts the user's behavior based on the reaction of similar users. All the data that is derived from other users is anonymized before it is incorporated into the model.

In one embodiment, the model generation engine 207 generates a model based on user information, for example, based on the user's search history or third-party accounts. Alternatively, the model generation engine 207 receives periodic updates (one hour, one day, one week, etc.) from the heterogeneous data sources and in turn updates the model.

In yet another embodiment, the model generation engine 207 generates a model each time it receives a request for generating a stream of content for a channel. The advantage of this method is that the newest updates are included and the model is current. The disadvantage is that generating the model and then comparing the candidate content items to the model to generate the stream of content takes more time than comparing the candidate content items to a pre-existing model. The model generation engine 207 transmits the model to memory 237 for storage.

The content categorizer 250 is software including routines for receiving and categorizing new content items from heterogeneous sources according to at least one category and other features. In one embodiment, the content categorizer 250 is a set of instructions executable by the processor 235 to provide the functionality described below for receiving and categorizing new content items. In another embodiment, the content categorizer 250 is stored in the memory 237 of the computing device 200 and is accessible and executable by the processor 235. In either embodiment, the content categorizer 250 is adapted for cooperation and communication with the processor 235, the scoring engine 211 and other components of the computing device 200 via signal line 227.

The content categorizer 250 receives new content items from heterogeneous data sources and annotates them with specific tags, such as features, global scores, etc. In this embodiment, the heterogeneous data sources include a search engine 143, an entertainment server 137, an email server 141, a ratings server 139, a social network server 101, and a third-party server 107. Once the items are annotated, the content categorizer 250 indexes each new content item based on the features and stores the content items in the memory 237. The new content items, in one embodiment, are indexed according to an identification format (MediaType#UniqueItemID, for example, "YOUTUBE#video_id" and "NEWS#doc_id"), an item static feature column that holds an item's static features (title, content, content classification, context, etc.), an item dynamic feature column that holds an item's dynamic features (global_score, number of clicks, number of following, etc.), a source (src) static feature column where the source is a publisher of an item (magazine in news, video uploading in YouTube, etc.) and a src dynamic feature column that holds the source's dynamic features. The content categorizer 250 categorizes the new content items to make their retrieval more efficient and fast.

The channel engine 240 is software including routines for generating a channel for a user. In one embodiment, the channel engine 240 is a set of instructions executable by the processor 235 to provide the functionality described below for generating a channel for a user. In another embodiment, the channel engine 240 is stored in the memory 237 of the computing device 200 and is accessible and executable by the processor 235. In either embodiment, the channel engine 240 is adapted for cooperation and communication with the processor 235, the scoring engine 211, the model generation engine 207, the user interface engine 240, and other components of the computing device 200 via signal line 230.

In one embodiment, the channel engine 240 identifies a channel category for a user based on historical trends and the user's activities, interests and social connections. The channel engine 240 submits a request for a stream of content that includes the channel category and channel attributes to the scoring engine 211. The channel engine 240 then receives a stream of content from the scoring engine 211 and generates the channel. The generated channel is either public or private depending on the user's settings. The channel engine 240 is explained in greater detail below with regard to FIG. 3A.

The scoring engine 211 is software including routines for generating a stream of content for a channel. In one embodiment, the scoring engine 211 is a set of instructions executable by the processor 235 to provide the functionality described below for globally scoring content items and for generating a stream of content for a channel. In another embodiment, the scoring engine 211 is stored in the memory 237 of the computing device 200 and is accessible and executable by the processor 235. In either embodiment, the scoring engine 211 is adapted for cooperation and communication with the processor 235, the processing unit 202, the collaborative filtering engine 217, the model generation engine 207, the channel engine 240 and other components of the computing device 200 via signal line 228.

In one embodiment, the scoring engine 211 receives the request from the channel engine 240 and queries the new content items stored in memory 237. In another embodiment, the scoring engine 211 directly queries the heterogeneous data sources. The scoring engine 211 receives candidate content items that include the channel category and the channel attributes. The scoring engine 211 then compares the candidate content items to the model to determine whether the user would find the candidate content items interesting.

In one embodiment, the scoring engine 211 first performs the query and then compares the results to the model to determine whether the user would find them interesting. In another embodiment, these steps are performed simultaneously. In yet another embodiment, the scoring engine 211 compares candidate content items to the model and then filters the results according to the subject matter of the queries. The scoring engine 211 is explained in greater detail below with regard to FIG. 3B.

The collaborative filtering engine 217 is software including routines for generating additional candidate content items for the channel through collaborative filtering and transmitting the additional candidate content items to the scoring engine 211 that were derived from collaborative filtering. In one embodiment, the collaborative filtering engine 217 is a set of instructions executable by the processor 235 to provide the functionality described below for generating additional candidate content items for the channel. In another embodiment, the collaborative filtering engine 217 is stored in the memory 237 of the computing device 200 and is accessible and executable by the processor 235. In either embodiment, the collaborative filtering engine 217 is adapted for cooperation and communication with the processor 235, the scoring engine 211 and other components of the computing device via signal line 226.

The collaborative filtering engine 217 obtains additional candidate content items that are socially relevant from a stream of content derived from people with whom the user has a relationship and transmits them to the scoring engine 211. For example, the stream of content is derived from friends in a social network such as the social network application 109 or people that the user frequently emails. The more important that the person appears to be to the user, the more likely that the user will be interested in the candidate content item. Thus, in one embodiment, the collaborative filtering engine 217 applies a weight to candidate content items based on the social relationship of the user to the friend. For example, users that are friends receive higher weights than candidate content items from second generation friends of the user (i.e., a friend of a friend). In one embodiment, the collaborative filtering engine 217 receives information about relationships between users from the social graph 179.

The collaborative filtering engine 217 increases the weights applied to candidate content items from friends when the user positively responds to the items. For example, if the user comments on the item or indicates that the user found the item interesting, the collaborative filtering engine 217 increase the weight so that more candidate content items from the friend become part of the stream of content.

The user interface engine 260 is software including routines for generating a user interface that, when rendered on a browser, displays a channel generated for a user and enables the user to customize the channel. In one embodiment, the user interface engine 260 is a set of instructions executable by the processor 235 to provide the functionality described below for generating a user interface. In another embodiment, the user interface engine 260 is stored in the memory 237 of the computing device 200 and is accessible and executable by the processor 235. In either embodiment, the user interface engine 260 is adapted for cooperation and communication with the processor 235, the channel engine 240 and other components of the computing device 200 via signal line 232.

The user interface engine 260 receives instructions from the channel engine 240 for generating a display. The user interface includes options for viewing a channel, requesting a new channel, modifying the user interests, and following suggested channels.

Alternate Embodiment of the System

Figure 2:
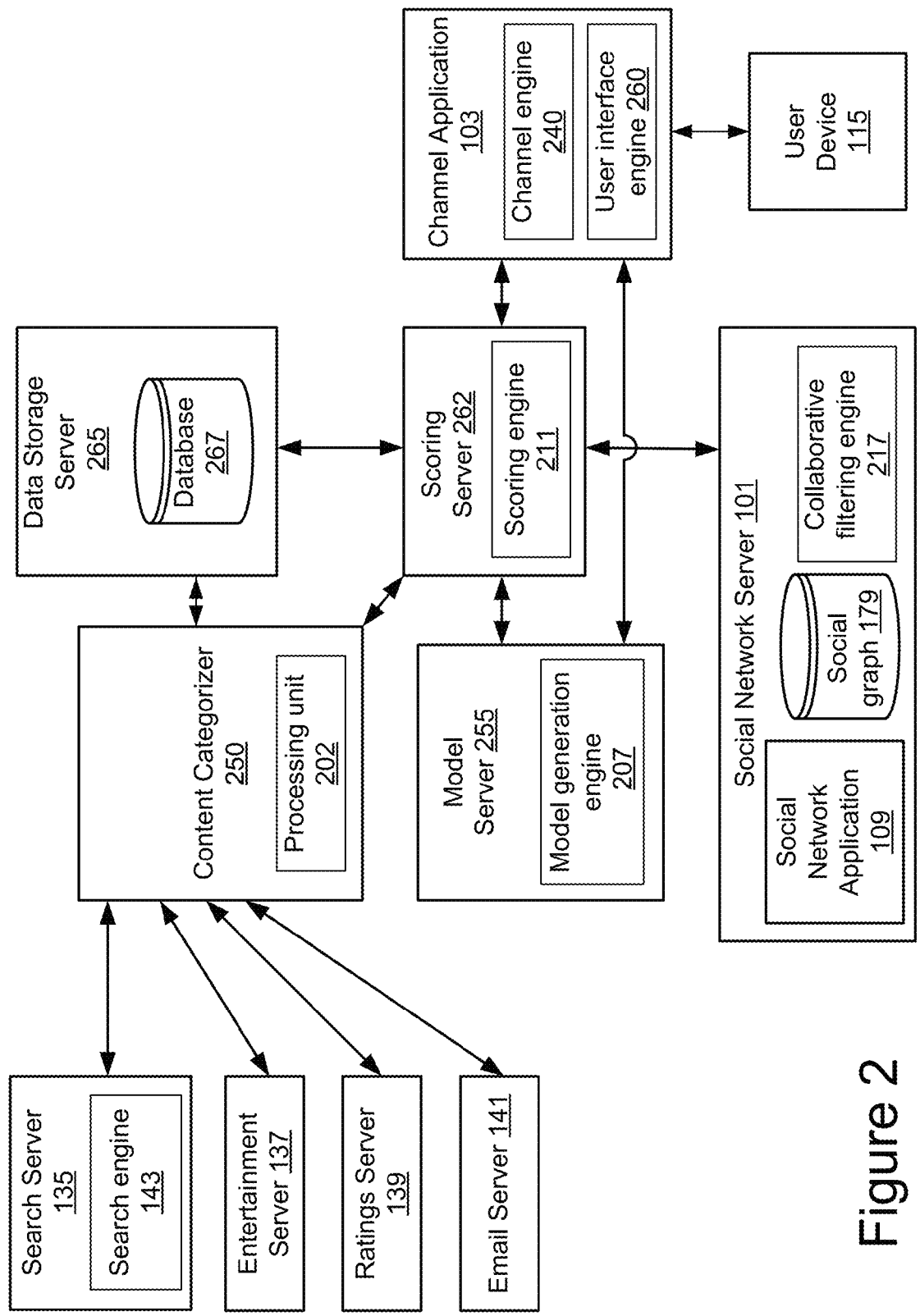
FIG. 2 is a high-level block diagram illustrating another embodiment of a system for generating a stream of content for a channel.

FIG. 2 is a high-level block diagram illustrating another embodiment of a system for generating a stream of content for a channel. In this embodiment, the components of the channel application 103 are divided among various servers so that the information is efficiently processed. The system includes a search server 135, an entertainment server 137, a ratings server 139, an email server 141, a content categorizer 250, a data storage server 265, a model server 255, a scoring server 262, a social network server 101, a user device 115, and a channel application 103.

A content categorizer 250 crawls the heterogeneous data sources (search server 135, entertainment server 137, ratings server 139, and email server 141) are crawled for new content items by the content categorizer 250 or the new content items are directly transmitted to the content categorizer 250.

The content categorizer 250 categorizes the new content items as mentioned above with regards to FIG. 1B and stores them in the database 267 of the data storage server 265. The content categorizer 240 also includes a processing unit 202 for processing user information (activities, interests and social connections). In one embodiment, the processing unit 202 stores the database 267.

In one embodiment, the data storage server 265 dynamically phases out the old content items. For example, news items expire after 24 hours, videos expire after 48 hours and feeds are kept for 24 hours or only the 10 most recent items, whichever is larger, etc.

The content categorizer 250 also transmits the new content items to the scoring server 262 for a global user ranking. The global scores are transmitted from the scoring server 262 to the data storage server 265, which stores the global scores in association with the new content items. The global scores are helpful for organizing the new content items in the data storage server 265 according to the more popular items.

Turning now to the model server 255, the model server 255 receives the user's activity, interests and social connections from the processing unit 202 or the data storage server 265. The model generation engine 207 generates a model based on user input and/or prior actions. The model server 255 transmits a model to the scoring server 262 and the channel application 103 periodically or upon request.

The channel application 103 includes a channel engine 240 and a user interface engine 260. In one embodiment, the channel engine 240 requests the model from the model server 255 and identifies a channel category that a user would find interesting. The channel engine 240 then transmits a request for a stream of content to the scoring server 262. The channel engine 240 receives the stream of content from the scoring server 262 and generates the channel. The user interface engine 260 generates a user interface for displaying a user interface that includes the channel and transmits it to the user device 115. In addition, the user interface engine 260 generates a user interface to allow the user to customize the channel or define a new channel. These user interfaces are explained in greater detail below with regard to FIGS. 4-5.

In one embodiment, the channel engine 240 transmits a query based on the channel category to the scoring server 262. The scoring server 262 queries and receives candidate content items from the data storage server 265. The scoring server 262 also queries and receives candidate content items from the social network server 101. The candidate content items from the social network server 101 are pre-scored by the collaborative filtering engine 217 and, in one embodiment, the unread candidate content items are saved to a cache on the social network server 101. These items are saved to a cache because the quantity of social updates can be large enough that performing the scoring during write time enables faster reads.

In one embodiment, the scoring engine 211 requests the model from the model server 255. The scoring server 262 then compares the candidate content items to the model and scores the candidate content items. The scoring engine 211 compares the candidate content items received from the social network server 101 to the model and rescores them according to the model. In another embodiment, the scoring engine 211 scores the candidate content items according to the category and any keywords associated with a channel. In either embodiment, the scoring engine 211 generates a stream of content based on the scored candidate content items and transmits the stream of content to the channel application 103.

Channel Engine 240

Figure 3A:
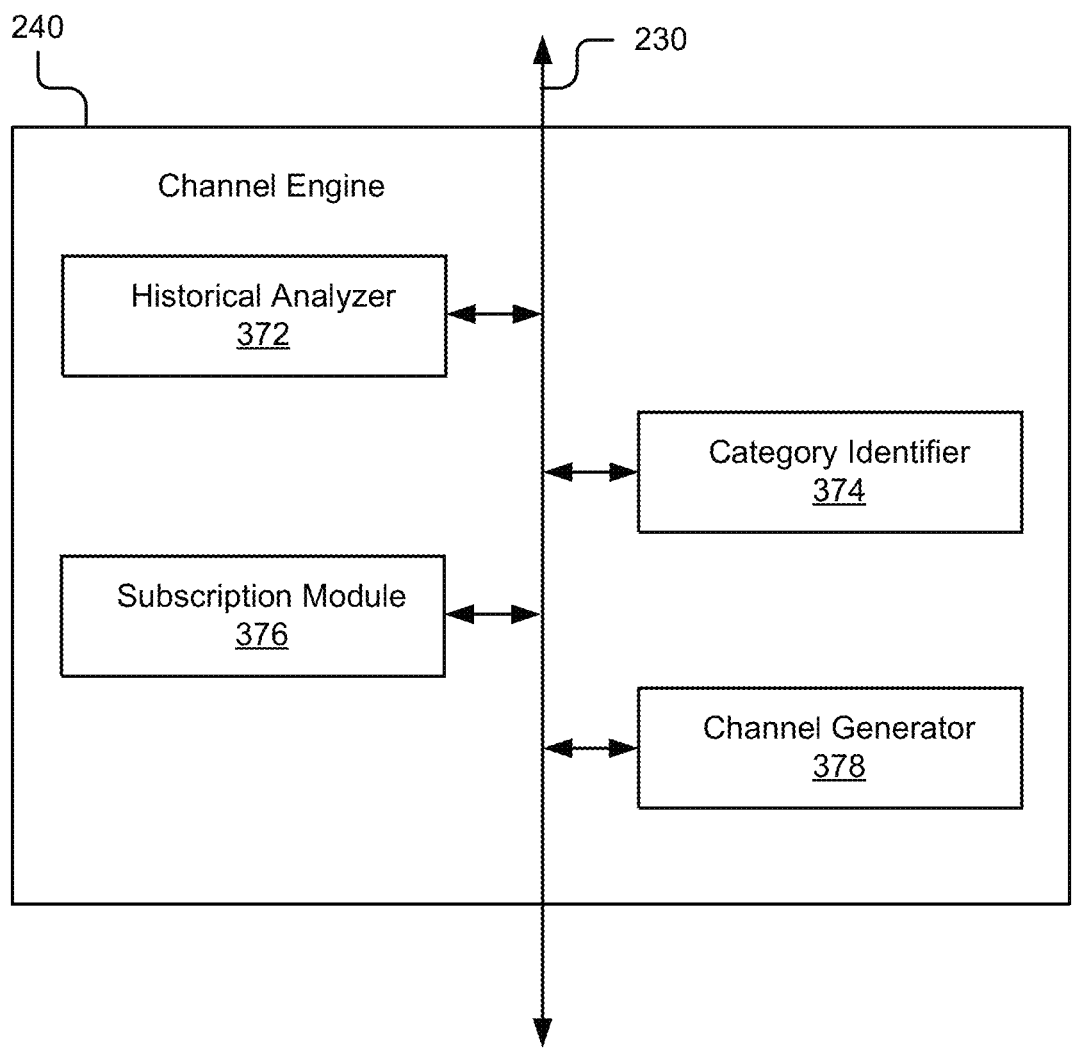
FIG. 3A is a block diagram of one embodiment of the channel engine in more detail.

Referring now to FIG. 3A, one embodiment of a channel engine 240 is shown in more detail. The channel engine 240 includes a historical analyzer 372, a category identifier 374, a subscription module 376 and a channel generator 378 that are each coupled to signal line 230.

The historical analyzer 372 is used to identify when a user will be interested in a particular category. The historical analyzer 372 identifies, for example, a time of the day or a year that a user will be interested in a category by analyzing historical trends associated with the category. In one embodiment, the historical analyzer 372 performs such analyses by measuring the increase or decrease in the number of new content items that are categorized under a content category or by measuring an increase or decrease in the number of times a new content item is accessed. For example, the number of times a tutorial on filing taxes is accessed would be very high during February-April. In another embodiment, the historical analyzer 372 also keeps track of events such as holidays, festivals, etc. Tracking such events is advantageous as, for example, many users might be interested in costume rentals during Halloween or camping during the Memorial Day and July $4^{th}$ weekends.

The category identifier 374 identifies a channel category for a user based on the user's interests, activities and social connections. In one embodiment, the category identifier 374 requests the model generated by the model generation engine 207 to identify the channel category. For example, the category identifier 374 identifies sports cars as a channel category because it is an explicit interest of the user. The category identifier 374 suggests channels including a source, a category, keywords, a media type, a size of a content item, and a location for a channel. For example, for a user that is interested in foreign politics, especially relations between the United States and China, the category identifier 374 suggests the category of U.S. and Chinese relations (e.g., entity="us_china_relations"), keywords such as trade and deficit because the user is particularly interested in the economic aspect of the relationship between China and the United States, a source such as The Economist (source="economist.com") because the user prefers The Economist over U.S. media outlets and the media being news articles because the user does not enjoy viewing videos.

In one embodiment, the category identifier 374 uses the analyses of the historical analyzer 374 for identifying a channel category for the user. This is advantageous as a user who has searched for US taxes might not be interested in knowing about it throughout the year, but it is beneficial for the user to have a separate channel for US taxes during the tax filing season. In yet another embodiment, the category identifier 374 uses contextual cues of the user for identifying channel categories. For example, the category identifier 374 identifies skiing in Switzerland as a channel category because winter sports is listed as an interest of the user and the user's current IP address is in Switzerland.

The subscription module 376 enables a user to subscribe to existing channels that are public. In one embodiment, the subscription module 376 enables a user to subscribe to a pre-defined channel (such as breaking news, most popular videos, updates from a social group, etc.). The channel application 103 generates the stream of content for pre-defined channels based on global scores of the new content items. Subscribing to pre-defined channels such as breaking news is advantageous as it helps the user to keep apprised of current information and discover new interests. Furthermore, because in one embodiment the breaking news channel is personalized since the content items are compared to a model for the user, the breaking news channel is more relevant than simply a list of popular or recent news items.

In another embodiment, the subscription module 376 enables a user to subscribe to another user's channel (a friend, a famous person, etc.) that is public. Subscribing to another user's channel is advantageous because, for example, a user who is interested in the stock market will benefit by viewing the stream of content that is viewed by a famous stock market analyst. In yet another embodiment, the subscription module 376 enables the user to search for channels that are public using the search engine 143. The subscription module 376, suggests such channels that are viewed by other users based on the interests of the user. In another embodiment, the subscription module 376 communicates with the collaborative filtering engine 217 to suggest channels viewed by other users with whom the user has a relationship.

The channel generator 378 submits a request for a stream of content for a channel to the scoring engine 211. The request includes the channel category identified by the category identifier 374 and channel attributes. The channel attributes include any attribute known to a person with ordinary skill in the art such as a source, presence of keywords, absence of keywords, a media type, a location, a time, a size of a content item, a date, etc. In one embodiment, the channel category and the channel attributes are defined by the user. In another embodiment, channel generator 378 defines the channel attributes for the channel category based on the user's preferences and activities. For example, if a user always reads news articles and seldom watches news videos, the channel generator 378 would define the media type for the channel as text based articles. At any point in time, the user can customize both the channel category and the channel attributes. The channel generator 378 then resubmits the request based on the changes made by the user.

In response to the request, the channel generator 378 receives a stream of content from the scoring engine 211 and generates the channel for the user. The generated channel is either public or private depending upon the user's preferences. In one embodiment, the user shares the channel to a community, a group of people or any internet user. The channel is then displayed to the user with an interface generated by the user interface engine 260.

Scoring Engine 211

Figure 3B:
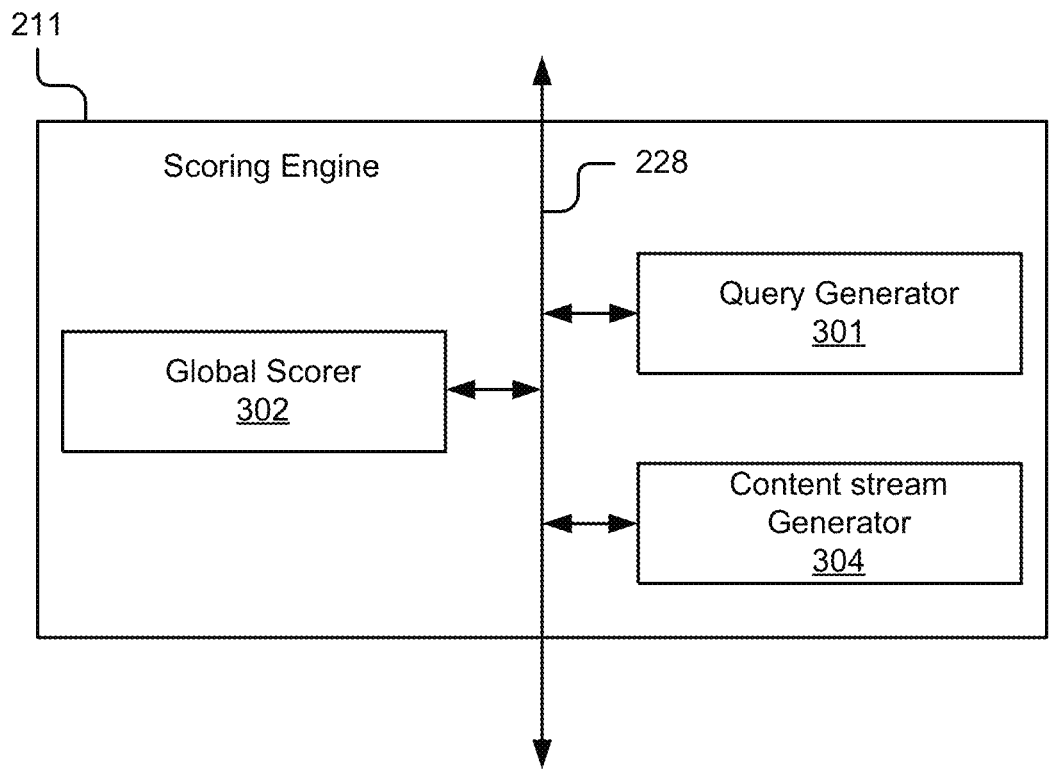
FIG. 3B is a block diagram of one embodiment of the scoring engine in more detail.

Referring now to FIG. 3B, one embodiment of a scoring engine 211 is shown in more detail. The scoring engine 211 includes a query generator 301, a global scorer 302 and a content stream generator 304 that are each coupled to signal line 228.

The global scorer 302 is used to rank new content items that are stored in the data storage server 265 or memory 237 (depending upon the embodiment). The global scorer 302 uses signals from the different verticals to compute a global user-independent score for each item to approximate its popularity or importance within the stream that produced it. The global scorer 302 normalizes the score across streams so that items from various streams are comparable to aid in generating a quick yet reasonable ranking of items. The global score is a combination of its quality specific to the source stream (depending on the rank of the source, number of known followers of a source, etc.) and its global popularity (trigger rate on universal search, relevance to trending queries, number of clicks, long clicks received, etc.).

The global scorer 302 transmits the global score to storage where it is associated with the item. The global score helps rank the items for faster retrieval. For example, if the query generated by the query generator 301 includes a request for the top ten items about skiing, those items are already organized in the data storage server 265 or memory 237 according to the global score.

The query generator 301 receives a request for a stream of content for a channel from the channel engine 240. The query generator 301 generates a query based on the channel attributes that are included in the request. The query generator 301 queries the data storage server 265 or memory 237 depending upon the embodiment. The following is an example query generated by the query generator 301: ((Category: Politics) AND (global_score>80) AND (source: NewsWebsite) AND (media type: Text)).

The content stream generator 304 receives candidate content items that include the channel attributes. The content stream generator 304, for the above mentioned query, receives text based articles that include the channel category politics and have a global score greater than 80. Additionally, the text based articles are from the source NewsWebsite. In one embodiment, the content stream generator 304 generates the stream by ordering the content items in order of their scores. In another embodiment, the content stream generator 304 determines an interestingness of each candidate content item to the user. The content stream generator 304 determines the interestingness by comparing the candidate content items with a model generated for the user by the model generation engine 207 and scoring them.

In one embodiment, the content stream generator 304 employs a probabilistic method that evaluates the probability (i.e., the score) that an item will be present in a user's stream of content for a channel. The random variables used to compute this probability is the lattice of various subsets of properties (global score, media type, source, etc.) shared between the item and the user. For a suitably rich set A of attributes, the random variable "item" is independent of the random variable "user," given the values of the attributes A. Thus for any setting {A=a} of the attributes, Pr(item|A=a, user)=Pr(item|A=a). Therefore, summing over all possible values a of A, obtains $$Pr(\text{item} \mid \text{user}) = \sum_p Pr(\text{item} \mid p) Pr(p \mid \text{user}),$$

where p is a property, that is, a setting A=a of the attributes. The latter quantity, Pr(p|user) is approximated from the user's history of interactions with content items as well as the user's search history and other opt-in data. Similarly, the former quantity, Pr(item|p) is approximated by the (suitably weighted) reciprocal of the number of items with property p (e.g., if it is expected that p=((Politics) AND (global_score>80) AND (source: NewsWebsite) AND (media type: Text)) to generate 300 items, take Pr(item|p) to be 1/300).

The difficulty of computing Pr(item|user) by the sum above is that the properties expressed in the query corresponding to the user are not independent, and may have correlations to take advantage of To support this, the content stream generator 304 begins with very simple approximations of the following form as a first step:

$$Pr(\text{item} \mid \text{user}) = G^{-1}\left(\sum_p G(Pr(\text{item} \mid p) Pr(p \mid \text{user}))\right),$$

where the properties p are summed over single-attribute properties (as opposed to all possible settings of an entire collection of attributes), and G is an exponential function of the form $G(x)=2^{(100 \cdot x)}$, so that when applied in this form, if there are several values of p for which Pr(item|p) Pr(p|user) is large, the sum of their G-values slowly increases.

Once the scores are calculated, the content stream generator 304 generates a stream of content for the channel that is ordered according to the candidate content item scores. In one embodiment, only the candidate content items that exceed a certain threshold are included in the stream of content for the channel.

User Interface Engine 260

Figure 4:
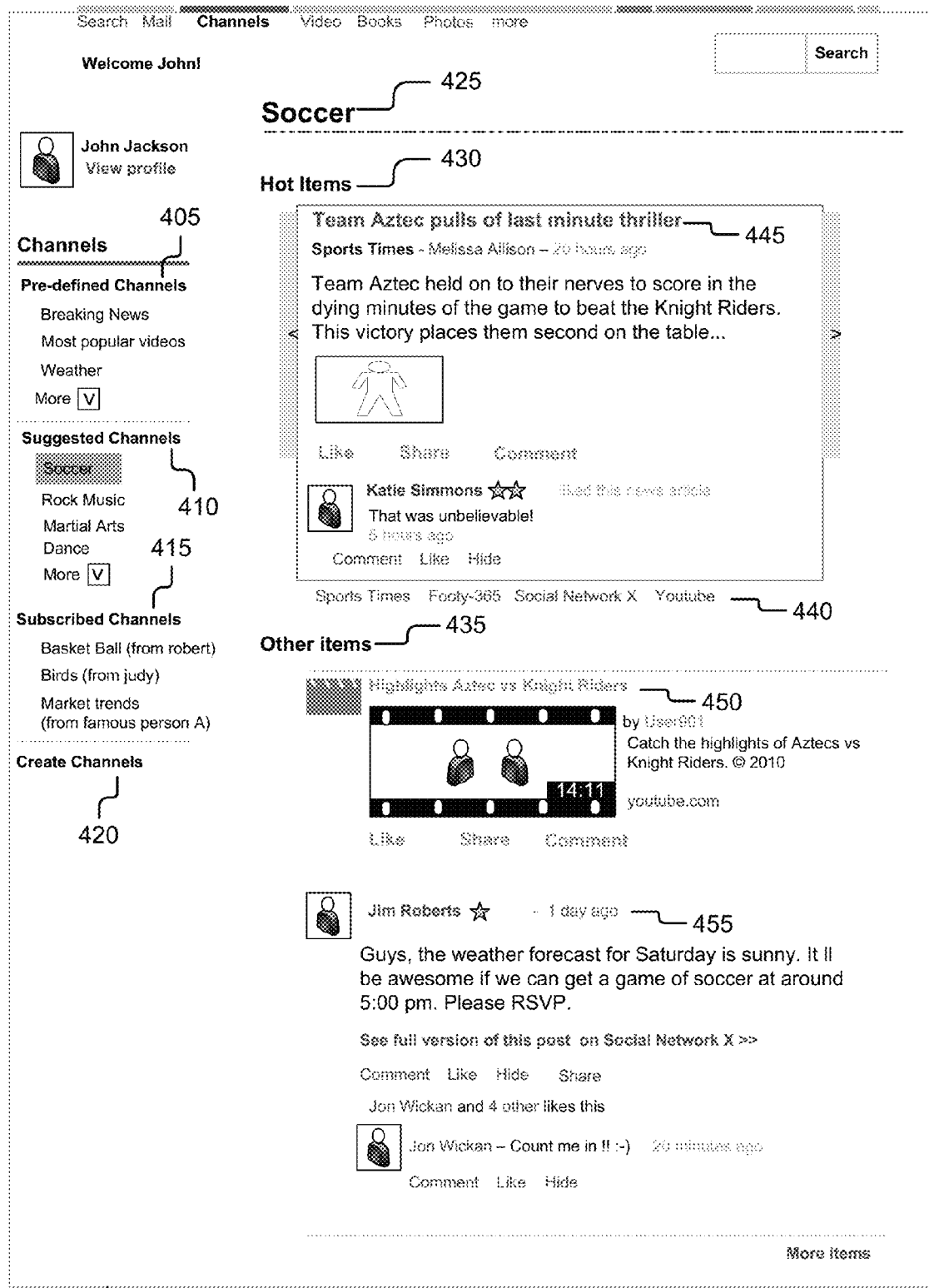
FIG. 4 is a graphic representation of a user interface that displays the stream of content of a channel.

Turning now to the user interface engine 260, FIG. 4 is a graphic representation 400 of a user interface generated by the user interface engine 260 for displaying the stream of content of a channel. In this example, the user interface 400 also includes channels 405 that are pre-defined, channels 410 that are suggested for the user and channels 415 that are subscribed to by the user. The user can also define new channels and attributes by clicking the link 420.

The example includes the stream of content for the user's soccer channel 425. The stream of content includes news items 445, videos 450 and social network news feeds 455 from the content sources 440 defined by the user. The candidate content items are listed in decreasing order of their scores. The user interface engine 260 lists five candidate content items with the highest scores in the hot items section 430. The remaining candidate content items are listed in the other items section 435. In another embodiment, the entire stream of content is listed in a single section.

Figure 5:
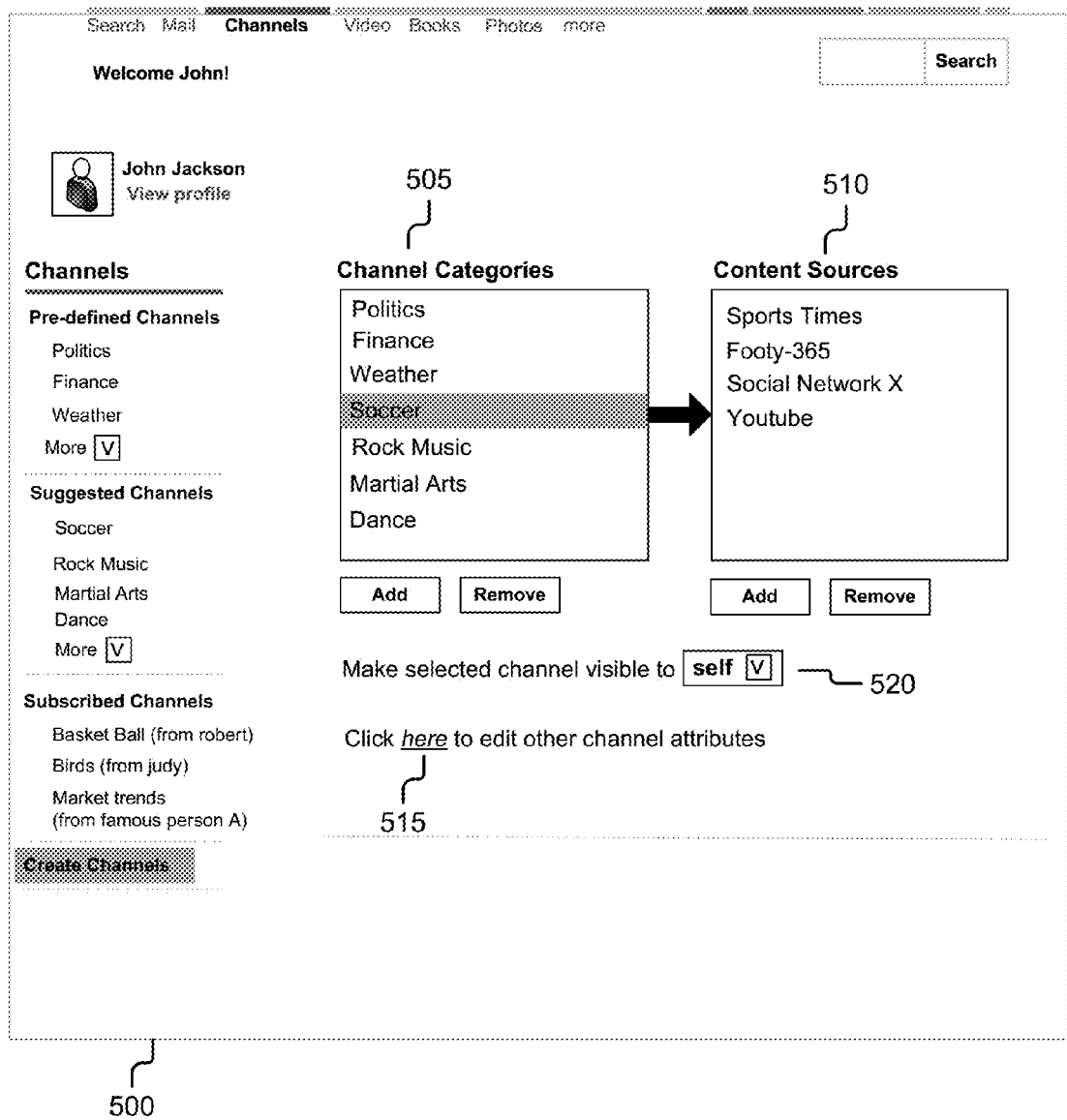
FIG. 5 is a graphic representation of a user interface that allows a user to define or customize a channel.

FIG. 5 is a graphic representation 500 of a user interface that is generated by the user interface engine 260 for a user to define a new channel or customize an existing channel. In this example, the user interface includes all the channel categories 505 that have been either pre-defined, suggested to the user, or subscribed by the user, and the content sources 510 for each channel category. The user customizes a channel by adding or removing content sources for the channel. In one embodiment, the user edits more advanced channel attributes such as media type, size of the content items, etc. by clicking on the link 515. The user makes the channel public, private or restricts it to a group of people by clicking on link 520. Additionally, the user can also define a new channel by adding a new channel category.

Methods

Figure 6:
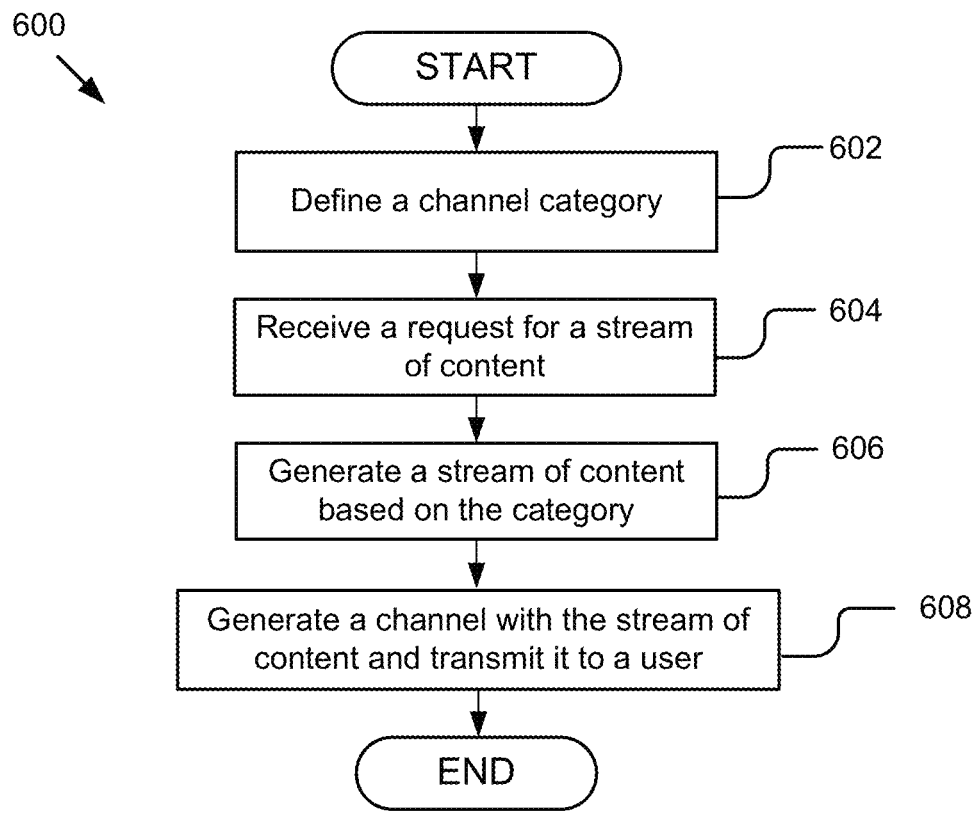
FIG. 6 is a flow diagram of one embodiment of a method for generating a stream of content for a channel.
Figure 7:
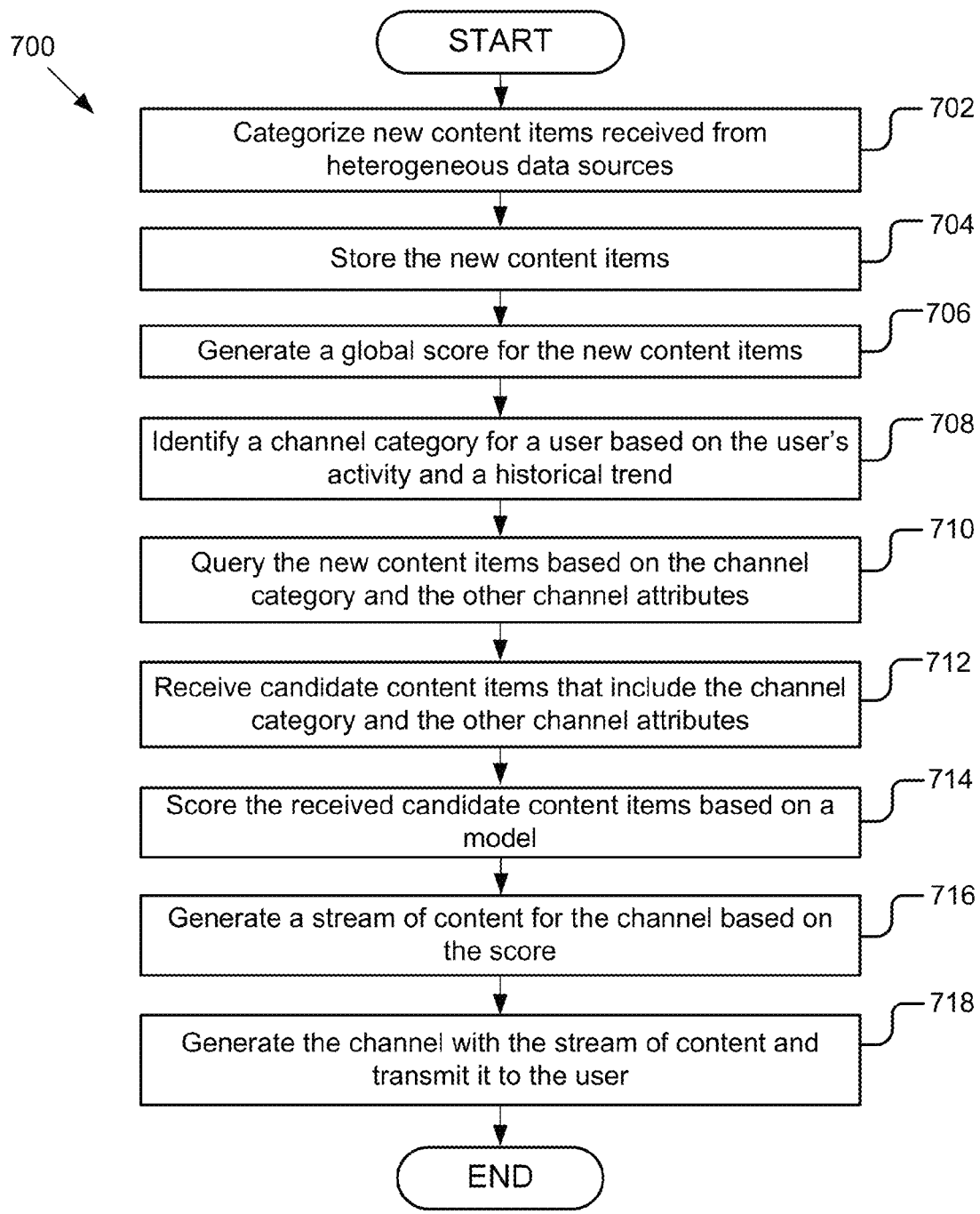
FIG. 7 is a flow diagram of another embodiment of a method for generating a stream of content for a channel.

Referring now to FIGS. 6-7, various embodiments of the method of the specification will be described. FIG. 6 is a flow diagram 600 of one embodiment of a method for generating a stream of content for a channel. The channel engine 240 defines 602 a channel category and submits a request for a stream of content. The request includes channel attributes including any of a category, a source, keywords, a media type, a location, a size of a content item, and a date. The channel category is defined based on a model for a user that is generated by the model generation engine 207 or the channel is defined by a user. The scoring engine 211 receives 604 the request including the channel category and generates 606 a stream of content based on the channel category. The channel engine 240 generates 608 a channel with the stream of content and transmits it to the user.

FIG. 7 is a flow diagram 700 of another embodiment of a method for generating a stream of content for a channel. The content categorizer 250 categorizes 702 new content items that are received from heterogeneous data sources. The new content items that are received from heterogeneous data sources include, for example, news articles, microblogs, blogs, videos, photos, etc. The content categorizer 250 categorizes the content according to a category and other features. The content categorizer 250 also stores 704 the new content items in a data storage server 265 or a memory 237, depending upon the embodiment. The global scorer 302 generates 706 a global score for each new content item. The category identifier 374 identifies 708 a channel category for a user based on the user's activities and a historical trend identified by the historical analyzer 372. The user's activity includes a search (such as web, video, news, maps, alerts), entertainment (such as news, video, a personalized homepage, blogs, a reader, gadget subscriptions), social activity (such as interactions through email, profile information, text messaging such as short message service (SMS), microblog, comments on photos, a social graph, and other social networking information), and activity on third-party sites (such as websites that provide ratings, reviews and social networks where users indicate that they approve of content) In one embodiment, the category identifier 374 also uses contextual information of the user to identify the channel category.

The query generator 301 generates a query based on the channel category and the channel attributes and queries 710 the new content items stored on the data storage server 265. The content stream generator 304 receives 712 candidate content items that include the channel category and channel attributes. In one embodiment, the content stream generator 304 receives additional candidate content items from the collaborative filtering engine 217.

The content stream generator 304 scores 714 each candidate content item by comparing it to a model generated by the model generation engine 207. The score is calculated by determining an interestingness of the candidate content item to the user. The content stream generator 304 then generates 716 the stream of content based on the scores for each candidate content item. The channel engine 240 then generates 718 a channel with the stream of content and transmits it to the user.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies, and other aspects are not mandatory or significant, and the mechanisms that implement the description or its features may have different names, divisions and/or formats. Furthermore, as will be apparent to one of ordinary skill in the relevant art, the modules, routines, features, attributes, methodologies, and other aspects of the specification can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   identifying, with one or more processors, a channel category of a channel for a user based on one of a historical trend and a user activity;
   receiving, with the one or more processors, a request to customize a stream of content for the channel category;
   responsive to the request to customize, querying, with the one or more processors, new content items based on the channel category and a channel attribute;
   receiving, with the one or more processors, candidate content items that include the channel category and the channel attribute;
   determining, with the one or more processors, a user-independent score for each of the candidate content items to approximate popularity of each candidate content item within the stream of content that produced it;

computing, with the one or more processors, a global score for each of the candidate content items by normalizing the user-independent score for each candidate content item across a plurality of streams of content, the global score identifying a popularity of each candidate content item within the plurality of streams of content;

customizing, with the one or more processors, the stream of content for the channel by adding the candidate content items to the stream of content based on the global score of each candidate content item; and providing, with the one or more processors, the customized stream of content.

2. The computer-implemented method of claim 1 comprising removing pre-existing content items included in the customized stream of content for the channel.

3. The computer-implemented method of claim 1 wherein the historical trend is one of an increase in a number of the new content items for a content category and an increase in a number of times one of the new content items is accessed.

4. The computer-implemented method of claim 1 comprising:
receiving the new content items from heterogeneous data sources; and
categorizing the new content items.

5. The computer-implemented method of claim 3 wherein the heterogeneous data sources include at least two from the group of a news article post, a news feed, a social feed, a blog post, a micro-blog post, a photo, a video, an audio, an email message, and a text based message.

6. The computer-implemented method of claim 1 comprising receiving a request from the user to subscribe to an existing channel.

7. The computer-implemented method of claim 1 wherein the channel category is also based on an interest of the user and a connection of the user.

8. The computer-implemented method of claim 1 wherein the user activity is an interaction of the user with an application, wherein the interaction of the user with the application includes providing at least one of a user preference, a user interest, a comment, a tag, and a search.

9. A computer program product comprising a non-transitory computer useable medium including a computer readable program, wherein the computer readable program when executed on a computer causes the computer to:
identify a channel category of a channel for a user based on one of a historical trend and a user activity;
receive a request to customize a stream of content for the channel category;
responsive to the request to customize, query new content items based on the channel category and a channel attribute;
receive candidate content items that include the channel category and the channel attribute;
determine a user-independent score for each of the candidate content items to approximate popularity of each candidate content item within the stream of content that produced it;
compute a global score for each of the candidate content items by normalizing the user-independent score for each candidate content item across a plurality of streams of content, the global score identifying a popularity of each candidate content item within the plurality of streams of content;
customize the stream of content for the channel by adding the candidate content items to the stream of content based on the global score of each candidate content item; and
provide the customized stream of content.

10. The computer program product of claim 9, wherein the computer readable program when executed on the computer also causes the computer to remove pre-existing content items included in the customized stream of content for the channel.

11. The computer program product of claim 9, wherein the historical trend is one of an increase in a number of the new content items for a content category and an increase in a number of times one of the new content items is accessed.

12. The computer program product of claim 9, wherein the computer readable program when executed on the computer also causes the computer to:
receive the new content items from heterogeneous data sources; and
categorize the new content items.

13. The computer program product of claim 12, wherein the heterogeneous data sources include at least two from the group of a news article post, a news feed, a social feed, a blog post, a micro-blog post, a photo, a video, an audio, an email message, and a text based message.

14. The computer program product of claim 9, wherein the computer readable program when executed on the computer also causes the computer to receive a request from the user to subscribe to an existing channel.

15. The computer program product of claim 9, wherein the channel category is also based on an interest of the user and a connection of the user.

16. The computer program product of claim 9, wherein the user activity is an interaction of the user with an application, wherein the interaction of the user with the application includes providing at least one of a user preference, a user interest, a comment, a tag, and a search.

17. A system comprising:
one or more processors; and
a memory storing instructions that, when executed, cause the system to:
identify a channel category of a channel for a user based on one of a historical trend and a user activity;
receive a request to customize a stream of content for the channel category;
responsive to the request to customize, query new content items based on the channel category and a channel attribute;
receive candidate content items that include the channel category and the channel attribute;
determine a user-independent score for each of the candidate content items to approximate popularity of each candidate content item within the stream of content that produced it;
compute a global score for each of the candidate content items by normalizing the user-independent score for each candidate content item across a plurality of streams of content, the global score identifying a popularity of each candidate content item within the plurality of streams of content;
customize the stream of content for the channel by adding the candidate content items to the stream of content based on the global score of each candidate content item; and
provide the customized stream of content.

18. The system of claim 17 wherein the system is further configured to remove pre-existing content items included in the customized stream of content for the channel.

19. The system of claim 17 wherein the historical trend is one of an increase in a number of the new content items for a content category and an increase in a number of times one of the new content items is accessed.

20. The system of claim 17 wherein the system is further configured to:
receive the new content items from heterogeneous data sources; and
categorize the new content items.

21. The system of claim 20 wherein the heterogeneous data sources include at least two from the group of a news article post, a news feed, a social feed, a blog post, a micro-blog post, a photo, a video, an audio, an email message, and a text based message.

22. The system of claim 17 wherein the system is further configured to receive a request from the user to subscribe to an existing channel.

23. The system of claim 17 wherein the channel category is also based on an interest of the user and a connection of the user.

24. The system of claim 17 wherein the user activity is an interaction of the user with an application, wherein the interaction of the user with the application includes providing at least one of a user preference, a user interest, a comment, a tag, and a search.

* * * * *